Nov. 3, 1964  L. E. SMITH ETAL  3,154,949
TEMPERATURE COMPENSATOR AND MEASURING
INSTRUMENT INCORPORATING THE SAME
Filed Aug. 22, 1960
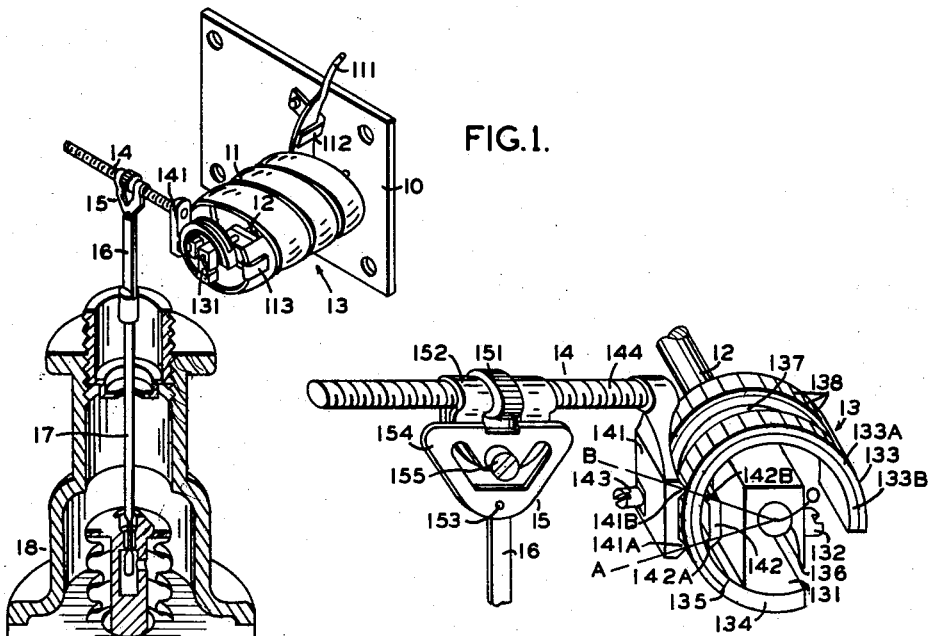
FIG. 1.
FIG. 2.
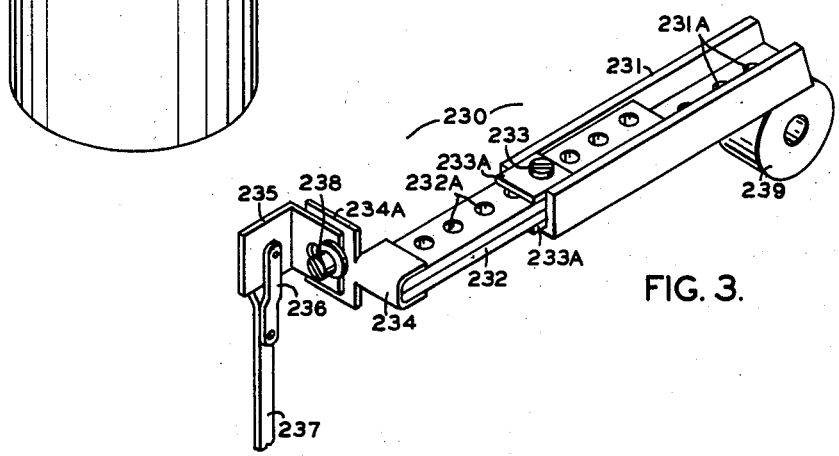
FIG. 3.

United States Patent Office 3,154,949
Patented Nov. 3, 1964

3,154,949
TEMPERATURE COMPENSATOR AND MEASURING INSTRUMENT INCORPORATING THE SAME
Lawrence Emerson Smith, Waterbury, and Philip Edward Rowland, Southbury, Conn., assignors to The Bristol Company, Waterbury, Conn., a corporation of Connecticut
Filed Aug. 22, 1960, Ser. No. 50,976
5 Claims. (Cl. 73—393)

The present invention relates to pressure measuring instruments and, more particularly, to ambient temperature compensated instruments of this class which are readily adaptable to different ranges or spans of the measured variable.

Pressure responsive instruments of this class commonly depend on the deflection of a Bourdon-tube element, of a single, or a multiple corrugated-surface diaphragm element, or of a corrugated-wall bellows element, in any of which the angular or linear expansion of the sensitive element is primarily a function of the difference between an internal, confined pressure and an external pressure which may, or may not, be confined. In general, however, the present invention is concerned with conditions in which the external pressure is that of the atmosphere, variations in which in their effect on measurements can be neglected.

It should be noted that pressure responsive systems of the present class are also commonly used as temperature measuring systems in which a confined fluid is subjected to a temperature to be measured, and changes in volume and/or pressure of the fluid, due to its coefficient of cubical expansion, produces, in effect, a variation in pressure in the closed system. This pressure is measurable by pressure responsive elements of the class under consideration and, similarly, is amenable to ambient temperature compensation by means described hereinafter.

Regardless of the use to which they are applied, pressure responsive elements are subject to important ambient temperature effects which may lead to significant errors in measurement unless taken into account. In general, two types of error may be distinguished: The first is a substantially linear "zero shift" proportional to ambient temperature and is chiefly associated with the effect of ambient temperature on the coefficient of linear expansion of the materials used in the fabrication of the pressure responsive system. The second, and usually the more significant, is a predominantly linear effect in which the error is proportional to both the pressure and the ambient temperature, thus affecting the "rate," or sensitivity, of the pressure element. This latter type of error may result from the effect of ambient temperature on the modulus of elasticity of the material from which the resilient member, that is, the Bourdon tube, the diaphragm member, etc., is made. In the case of a fluid-filled thermometer system, the effect of the change of volume of the fluid in the pressure responsive element under the influence of ambient temperature may also produce an error which varies with pressure (deflection). Under some circumstances, both of the above "rate" effects may be jointly involved.

In practice, wherein maximum flexibility is desired in adapting a given measuring system to a variety of conditions, it has been found necessary not only to provide automatic compensation for the errors due to ambient temperature variations, but also to adapt such compensation readily to alterations in width or level of "span." For purposes of this application, "span" is defined as the absolute value of the range of measurement determined as the difference between the upper and lower limit expressed in pounds per square inch, or degrees of temperature, etc. In contradistinction, the term, "range," unless otherwise indicated, refers to the actual level of measurements and is stated in terms of the upper and lower limiting values.

It is therefore a principal object of our invention to provide in a pressure responsive system, ambient temperature compensation easily adjustable to various ranges and spans of measurement.

It is also an object to provide means for readily making adjustments to adapt to predetermined ranges and spans of operation of a given pressure element.

It is another object to provide a linkage system between a pressure responsive element and the utilization device which shall be simple, versatile and readily adjustable.

Further objects and advantages will be apparent from the following description and the accompanying drawing in which FIGURE 1 is a side elevational view in perspective, partially in cross section, of a pressure responsive element attached to an indicator device including the compensating member according to the present invention;

FIGURE 2 is a detailed view in perspective of the compensator and linkage member with which it is associated; and FIGURE 3 is another form of compensator and linkage arm constructed in accordance with the present invention.

Referring now to FIGURES 1 and 2 of the drawing, our invention will now be described in connection with a pressure sensitive element 11, which in the present instance is a helical Bourdon tube, the fluid pressure to be measured being conducted to the interior of the element 11 through the conduit connection 111. One end of the element 11 is fastened rigidly to support member 112 and anchored to support 10 and the other end to a central shaft 12 through connector 113 by which the movements of the sensitive element 11 are converted to rotary movements about the fixed axis of shaft 12. The shaft 12 is rotatably supported on the member 10. With the pressure sensitive element 11 a Bourdon tube, as shown, it may have a common axis of rotation with a multiplying linkage 14 yet to be described. In the case of diaphragm or bellows pressure sensitive elements which produce rectilinear deflections, an intermediate bar linkage of well-known form is utilized to convert the rectilinear motion of such pressure sensitive elements to rotary motions of shaft 12.

Compensator assembly 13 comprises a clamp bracket member 131, having a centrally-placed slotted hole, which embraces the axial shaft 12 (FIGURE 1) and is locked thereto by a clamping screw 132. This bracket 131 is attached to the inactive portion 134 of the compensator ring as by welding. The compensator itself is generally circular in form and comprises inactive portion 134 and an active portion 133, the former being of steel and the latter of bimetal, that is, of two metals as 133a and 133b, of different coefficients of linear expansion intimately joined as by welding along the length of the element. The active element may also be joined to the inactive portion by welding as along the line 135. The bimetal portion along a major part of its length is slotted as at 137. Indicia 138 marked on the outer face of the bimetal compensator identify certain ranges of motion of this element under the influence of ambient temperature conditions.

Multiplying linkage arm 14 is connected to the compensator 13 through an adjustable clamp comprising two members 141 and 142. The two parts of the clamp 141 and 142 are joined by a screw 143 which passes through a clearance hole in the one, through the slot 137 in the compensator 13 and into the member 142 which is threaded and function as a retainer. These cooperating clamp members 141 and 142 are formed wide enough to straddle substantially the full axial width of the compensator and each is formed with spaced-apart, knife-edge bearing points 142A and 142B, in member 142 juxtaposed to points 141A and 141B in member 141. These juxtaposed points are disposed so that they will make effectively line contact with the compensator along the radial planes OA and OB, extending from the common axis O of the compensator and shaft 12. By these means, tightening of the screw 143 firmly fixes the position of the clamp but does not involve any distortion of unwanted shift of the compensator unit.

To an extended portion of clamp member 141 is fixed the link member 14 which comprises a rod 144 threaded throughout its length. The effective length of this link is determined by position of a rider 15 comprising a bracket 152 which slidably engages the rod 144 on either side of a nut 151 threaded on to the rod member. Fastened to this bracket by screw 155 is a clip member 154 at the end of which is a retaining snap pivot 153 by which connection is made to an output link 16. The output link 16 is in turn connected to a second output link 17 of any one of a great variety of motion utilizing, or exhibiting, means illustrated here by the unit 18. Examples of such devices are pressure indicators, recorders, pressure transmitters, or pressure control equipment.

It is to be noted that the compensator 13 is connected between the shaft 12 and the link 14 so that the latter is rotated about shaft 12 in response to a change in ambient temperature in the direction opposite to that in which the shaft 12 is rotated by the element 11 in response to that change in ambient temperature.

In the present instance, the dependent device 18 is a pressure transmitter of conventional design in which the motion of member 17 is reproduced in terms of a fluid pressure at its output.

The principles of operation and the novel features of our invention may be more clearly understood from the following discussion:

In general, the total output motion of the link 16 may be assumed to be fixed by the span of motion required for full effect of the utilization device 18, for example, the travel of a pilot valve member, the maximum angle of an indicator scale, or the width of a recorder chart, etc. On the other hand, the pressure responsive element 11 has theoretically, a fixed sensitivity, that is, angular deflection per unit pressure, and, hence, for any given range of pressure to be measured, the fixed total output deflection is accommodate to the range of movement of the pressure element 11 by means of a multiplying or dividing linkage; in this case, by merely selecting the effective radius of the motion take-off, measured between the axis O of shaft 12 and the pivot 153 of the clip member 154. As shown in the drawing, this point is readily adjustable through operation of nut 151.

Now, taking account of ambient operating conditions, the foregoing linkage relationship is assumed to have been established at a zero, or reference, point of pressure measurement for a particular ambient temperature condition. Any departure from this condition will cause expansion of the element 11 or sensitivity changes of this element (assuming, for the moment, constant measured pressure) and, unless corrected, such effects will cause spurious deflections of the output member. It is thus the effect of the bimetal compensator, hereinbefore described, to subtract a constant value from the deflection of the pressure element at any given value of ambient temperature different from the reference, or calibration value. This deflection will include effects of linear expansion on the measuring system and the compensation for this component, if significant at all, may therefore be quite exact. It also includes the effects on "rate," or sensitivity, when, for limited spans of measurement, the compensation may not be strictly exact except for one point but if, for example, that point is established in the middle of the span, the average correction is generally considered sufficiently exact for all practical purposes.

In principles, the method of compensation according to our invention, may be applied, as noted above, to linear errors resulting from linear expansion of materials and also to errors involving change in slope of the characteristic curve of pressure elements, either separately or in combination. Significant linear errors are balanced by simply adjusting the effective length of the bimetal element to achieve the desired sensitivity (compensating movement per degree of ambient temperature). Usually, however, the "rate" error is the more significant, and in this case the departure of the mid-point of the given span for an arbitrary range of ambient temperature is known and an effective length of the compensating bimetal is selected which, as closely as possible, approximates this variation for the same arbitrary range of ambient temperature.

To effect the desired correction the curvature of the bimetal compensator is oriented so that it will deflect in the direction opposite to the spurious deflection and in amount substantially equal thereto for the purpose of efficient compensation. The effective length of the bimetal compensator is measured between the boundary of the inactive portion 134 of the compensator element and the position of the clamp points, 141A and B and 142A and B.

When the range of the pressure to which the pressure element 11 is subjected is shifted without a change in span, it is merely required to reset the compensator to a point corresponding to the desired point of exact compensation if that point be changed. In practice, different points of the range may be selected for compensation depending upon requirements. When the span is changed, the compensator may or may not be reset depending upon the desired point of exact compensation. On the other hand, any change in span (a range change thus results) always requires that the length of the multiplying linkage be changed accordingly.

It is an important feature of our invention that these requirements for resetting the compensator can be pre-established by test and specified for any measuring system in connection with a series of uniform scale markings provided on the compensator member. If, then, for a selected span of measurement the compensator is set in accordance with pre-established data, thereby fixing the position of the clamp member with reference to the compensator scale, and, concomitantly, the output member is adjusted to a "zero," or reference value, and the linkage arms are adjusted for proper multiplication between the measuring element and the output member, all other points within the range of measurement are thereby determined and include compensation for ambient temperature effects on the system. Such changes, thus, are simply carried out and greatly simplify manufacturing and servicing in industrial measurement and control installations involving pressure measuring instruments.

Although the embodiment of our invention described in the foregoing is preferred for present uses, it is recognized that other forms are possible and may have advantages for specific applications. Thus, another form of compensator is shown in FIGURE 3 of the drawings which may be used. In this, the compensator bar 230 is in the form of a straight, but adjustable, link which can be interposed between the primary axis of rotary motion of the pressure responsive element 11 and an output motion take-off member 237.

The linkage bar 230 is in two parts one slidable within the other. One arm member 231 is trough-like and is attached to a hub 239. The second arm member 232 is formed of double-layered, bimetal stock and is drilled with spaced, clearance holes 232A which mate with a series of threaded holes 231A in the associated trough-like member 231. A screw 233 holds the two parts together through interposed spacers 233A on either side of the bimetal strip to prevent interference with the deflection of the bimetal by the member 231. At the outboard end of the bimetal arm 232, a clip 234 is soldered or welded. This is conveniently formed with a tab portion 234A to accommodate a right angular bracket 235 adjustably held by screw 238 to the tab 234A. In the plane at right angles to the tab 234A, the bracket provides a mounting hole with which the motion take-off clip 236 is engaged. The rod 237 is connected to the utilization device as described in connection with member 17 in FIGURE 1.

The operation of this alternate embodiment of our invention is similar to the preferred form hereinbefore described. The hub 239 is fixed to shaft 12 of the pressure responsive element 11 and the output motion is communicated to link 237. Ambient temperature changes cause deflection of the compensator 232 and, also, the measuring element 11, the former being so oriented and adjusted that its deflection is equal and opposite to the latter.

In adjusting the compensation to the pressure span of the element, the position of the screw 233 is located in one of the holes of the bimetal element 232. Thus, the effective length of the bimetal portion of arm 232 is established. Now, to fix the effective overall length of the linkage arm, the screw 233 is screwed tightly into the appropriate hole in the lower (thermally insensitive) portion of the arm member 231. As in the previous embodiment, the overall length is determined by the desired range of the measuring system and is established by well understood means. The adjustments for shifts in span may or may not involve changes in effective linkage arm length as the case may be, but as far as compensation is concerned the proper selection of the holes for greatest accuracy can be specified from pre-established data. For convenience the holes 231A and 232A may be numbered or otherwise supplied with indicia to facilitate adjustment.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What we claim is:

1. In a measuring apparatus for providing a representation of a variable quantity, means responsive to said variable quantity for providing an output representative thereof and which is characterized by being subject to errors of a first kind proportional to ambient temperature and by being subject to errors of a second kind proportional to both ambient temperature and a second variable, output means responsive to said variable-quantity-responsive means for providing a representation of said variable quantity, said output means including a movable input member, a rotatable element mounted for rotation about an axis through an arc representative of the output of said variable-quantity-responsive means, an arcuate bimetallic member removably connected adjacent to one end thereof to said element and rotatable therewith about said axis, an elongated link, means connecting said link to said input member and movable longitudinally along said link for adjusting the effective length thereof, and means connecting said link to said bimetallic member and movable along the latter for selectively adjusting the effective length of said bimetallic member included between said rotatable element and said link, said bimetallic member being mounted to rotate said link about said axis in response to a given change in ambient temperature in the direction opposite to that in which said element is rotated in response to said change in ambient temperature, whereby errors of said first and second kind are substantially eliminated.

2. In a measuring apparatus for providing a representation of a variable quantity, means responsive to said variable quantity for providing an output representative thereof and which is characterized by being subject to errors of a first kind proportional to ambient temperature and by being subject to errors of a second kind proportional to both ambient temperature and a second variable, output means responsive to said variable-quantity-responsive means for providing a representation of said variable quantity, said output means including a movable input member, a rotatable element mounted for rotation about an axis through an arc representative of the output of said variable-quantity-responsive means, an arcuate bimetallic member removably connected adjacent to one end thereof to said element and rotatable therewith about said axis, an elongated link, means connecting said link to said input member and movable longitudinally along said link for adjusting the effective length thereof, and means including a pair of complementary clamp members connecting said link to said bimetallic member and movable along the latter for selectively adjusting the effective length of said bimetallic member included between said rotatable element and said link, said clamp members being disposed along opposite surfaces of said bimetallic member and having complementary knife edges formed therealong providing the sole engagement between said clamp members and said bimetallic member, said complementary knife edges extending along a plane intersecting said axis, said bimetallic member being mounted to rotate said link about said axis in response to a given change in ambient temperature in the direction opposite to that in which said element is rotated in response to said change in ambient temperature, whereby errors of said first and second kind are substantially eliminated.

3. In a measuring apparatus for providing a representation of a variable quantity, means responsive to said variable quantity for providing an output representative thereof and which is characterized by being subject to errors of a first kind proportional to ambient temperature and by being subject to errors of a second kind proportional to both ambient temperature and a second variable, output means responsive to said variable-quantity-responsive means for providing a representation of said variable quantity, said output means including a movable input member, a rotatable element mounted for rotation about an axis through an arc representative of the output of said variable-quantity-responsive means, an arcuate bimetallic member of substantially uniform curvature removably connected adjacent to one end thereof to said element and rotatable therewith about said axis, an elongated link, means connecting said link to said input member and movable longitudinally along said link for adjusting the effective length thereof, and means including a pair of complementary clamp members connecting said link to said bimetallic member and movable along the latter for selectively adjusting the effective length of said bimetallic member included between said rotatable element and said link, said clamp members being disposed along opposite surfaces of said bimetallic member and having a pair of knife edges formed therealong with each of the knife edges on one of said clamp members being complementary to one of the knife edges on the other one of said clamp members, said knife edges providing the sole engagement between said clamp members and said bimetallic member, said complementary knife edges extending along a plane intersecting said axis, said bimetallic member being mounted to rotate said link about said axis in response to a given change in ambient temperature in the direction opposite to that in which said element is rotated in response to said change in ambient temperature, whereby errors of said first and second kind are substantially eliminated.

4. In a measuring apparatus for providing a representation of a variable quantity, means responsive to said variable quantity for providing an output representative thereof and which is characterized by being subject to errors of a first kind proportional to ambient temperature and by being subject to errors of a second kind proportional to both ambient temperature and a second variable, output means responsive to said variable-quantity-responsive means for providing a representation of said variable quantity, said output means including a movable input member, a rotatable element mounted for rotation about an axis through an arc representative of the output of said variable-quantity-responsive means, an arcuate bimetallic member of substantially uniform curvature and having a circumferentially extending slot formed therethrough, said bimetallic member being removably connected adjacent to one end thereof to said element and rotatable therewith about said axis, an elongated link, means connecting said link to said input member and movable longitudinally along said link for adjusting the effective length thereof, and means including a pair of complementary clamp members connecting said link to said bimetallic member and movable along the latter for selectively adjusting the effective length of said bimetallic member included between said rotatable element and said link, said clamp members being disposed along opposite surfaces of said bimetallic member and having a pair of knife edges formed therealong with each of the knife edges on one of said clamp members being complementary to one of the knife edges on the other one of said clamp members, said knife edges providing the sole engagement between said clamp members and said bimetallic member, said complementary knife edges extending along a plane intersecting said axis, means extending through said slot for releasably securing said clamp members to said bimetallic member, said bimetallic member being mounted to rotate said link about said axis in response to a given change in ambient temperature in the direction opposite to that in which said element is rotated in response to said change in ambient temperature, whereby errors of said first and second kind are substantially eliminated.

5. In a measuring apparatus for providing a representation of a variable quantity, means including a Bourdon tube responsive to said variable quantity for providing an output representative thereof and which is characterized by being subject to errors of a first kind proportional to ambient temperature and by being subject to errors of a second kind proportional to both ambient temperature and pressure, output means responsive to said variable-quantity-responsive means for providing a representation of said variable quantity, said output means including a movable input member, a rotatably mounted element connected to said Bourdon tube for rotation about an axis through an arc representative of the output of said variable-quantity-responsive means, an arcuate bimetallic member of substantially uniform curvature and having a circumferentially extending slot formed therethrough, said bimetallic member being removably connected adjacent to one end thereof to said element and rotatable therewith about said axis, an elongated link, means connecting said link to said input member and movable longitudinally along said link for adjusting the effective length thereof, and means including a pair of complementary clamp members connecting said link to said bimetallic member and movable along the later for selectively adjusting the effective length of said bimetallic member included between said rotatable element and said link, said clamp member being disposed along opposite surfaces of said bimetallic member and having a pair of knife edges formed therealong with each of the knife edges on one of said clamp members being complementary to one of the knife edges on the other one of said clamp members, said knife edges providing the sole engagement between said clamp members and said bimetallic member, said complementary knife edges extending along a plane intersecting said axis, means extending through said slot for releasably securing said clamp members to said bimetallic member, said bimetallic member being mounted to rotate said link about said axis in response to a given change in ambient temperature in the direction opposite to that in which said element is rotated in response to said change in ambient temperature, whereby errors of said first and second kind are substantially eliminated.

References Cited in the file of this patent

UNITED STATES PATENTS

| | | |
|---|---|---|
| 1,000,435 | Pagelsen | Aug. 15, 1911 |
| 1,194,624 | Titterington | Mar. 26, 1940 |
| 2,387,909 | Ingham | Oct. 30, 1945 |
| 2,628,501 | Knapp | Feb. 17, 1953 |
| 3,004,434 | Heise | Oct. 17, 1961 |

UNITED STATES PATENT OFFICE
CERTIFICATE OF CORRECTION

Patent No. 3,154,949                November 3, 1964

Lawrence Emerson Smith et al.

It is hereby certified that error appears in the above numbered patent requiring correction and that the said Letters Patent should read as corrected below.

Column 3, line 45, for "accommodate" read -- accommodated --; line 74, for "principles" read -- principle --; column 8, line 39, for "1,194,624" read -- 2,194,624 --.

Signed and sealed this 6th day of April 1965.

(SEAL)
Attest:

ERNEST W. SWIDER                EDWARD J. BRENNER
Attesting Officer                Commissioner of Patents